(12) United States Patent
Wright (10) Patent No.: US 8,199,110 B1
(45) Date of Patent: Jun. 12, 2012

(54) METHOD AND APPARATUS FOR DETECTING MOVEMENTS IN AN ELECTRONIC DEVICE

(75) Inventor: David G. Wright, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 791 days.

(21) Appl. No.: 11/006,944

(22) Filed: Dec. 7, 2004

Related U.S. Application Data (60) Provisional application No. 60/531,338, filed on Dec. 19, 2003.

(51) Int. Cl.
*G06F 3/033* (2006.01)
*G09G 5/08* (2006.01)
(52) U.S. Cl. .................... 345/166; 345/165; 250/221
(58) Field of Classification Search .......... 345/156–167; 250/200, 216, 221
See application file for complete search history.

(56) References Cited

U.S. PATENT DOCUMENTS

| | | | | |
|---|---|---|---|---|
| 2,448,597 A | * | 9/1948 | Jolley et al. .................... | 340/429 |
| 2,947,830 A | * | 8/1960 | Goss ............................ | 200/61.51 |
| 3,597,753 A | * | 8/1971 | Tabankin ..................... | 340/539.31 |
| 3,752,945 A | * | 8/1973 | Achterberg .................... | 200/277 |
| 4,196,429 A | * | 4/1980 | Davis ........................... | 340/669 |
| 4,345,238 A | * | 8/1982 | Weir ............................ | 340/439 |
| 4,503,299 A | * | 3/1985 | Henrard et al. ............ | 200/61.52 |
| 4,688,025 A | * | 8/1987 | Frank .......................... | 340/571 |
| 4,884,067 A | * | 11/1989 | Nordholm et al. ............ | 340/689 |
| 5,267,318 A | * | 11/1993 | Severson et al. ............. | 704/270 |
| 5,410,113 A | * | 4/1995 | Mielke .................... | 200/61.45 R |
| 6,025,830 A | * | 2/2000 | Cohen .......................... | 345/156 |
| 6,198,396 B1 | * | 3/2001 | Frank ........................ | 340/573.1 |
| 6,223,295 B1 | * | 4/2001 | Wang et al. .................. | 713/320 |
| 6,853,301 B2 | * | 2/2005 | Devine ........................ | 340/571 |
| 7,199,783 B2 | * | 4/2007 | Wenstrand et al. .......... | 345/156 |
| 2004/0119687 A1 | * | 6/2004 | Suzuki et al. ................ | 345/156 |

* cited by examiner

*Primary Examiner* — Kimnhung Nguyen (57) ABSTRACT

A motion detector includes a motion sensor that in one embodiment is an electrically conductive pin that has a fixed upper portion and a lower portion that swings from the upper portion while maintaining electrical conductivity. The lower portion of the pin is located within a hole that has conductive areas. A motion detection circuit identifies movements in a device containing the motion detector by monitoring the electrical contact status between the motion sensor and the conductive areas around the hole.

14 Claims, 9 Drawing Sheets

METHOD AND APPARATUS FOR DETECTING MOVEMENTS IN AN ELECTRONIC DEVICE

This application claims priority from U.S. Provisional Application Ser. No. 60/531,338, filed Dec. 19, 2003.

TECHNICAL FIELD

The present invention relates generally to motion detectors and in particular to detecting movements in electronic devices.

BACKGROUND OF THE INVENTION

One of the leading challenges facing designers of wireless products is achieving acceptable battery life without requiring large batteries that impact the weight and form factor of the product. A conventional solution to this problem is to place the wireless device in a very low power sleep mode, or standby mode, when it is not in use. In this case, the challenge is to accurately determine when the device is in use and when it can safely be put in sleep mode, and to then transition between sleep and active modes quickly enough for the power management activity to be undetectable to the user, while maximizing power savings.

In a wireless mouse input device, recent movement of the device is a good indicator of whether or not the mouse is in use. Other applications where recent movement is a good indicator of device use include wireless game-pads, remote controls, and many other wireless and cabled handheld devices that are battery or externally powered.

A significant challenge facing designers of wireless mice and other wireless products is battery life. Mice typically use optical sensors to detect mouse motion. The optical sensor and associated surface illumination are the largest consumers of power.

Figure 1:
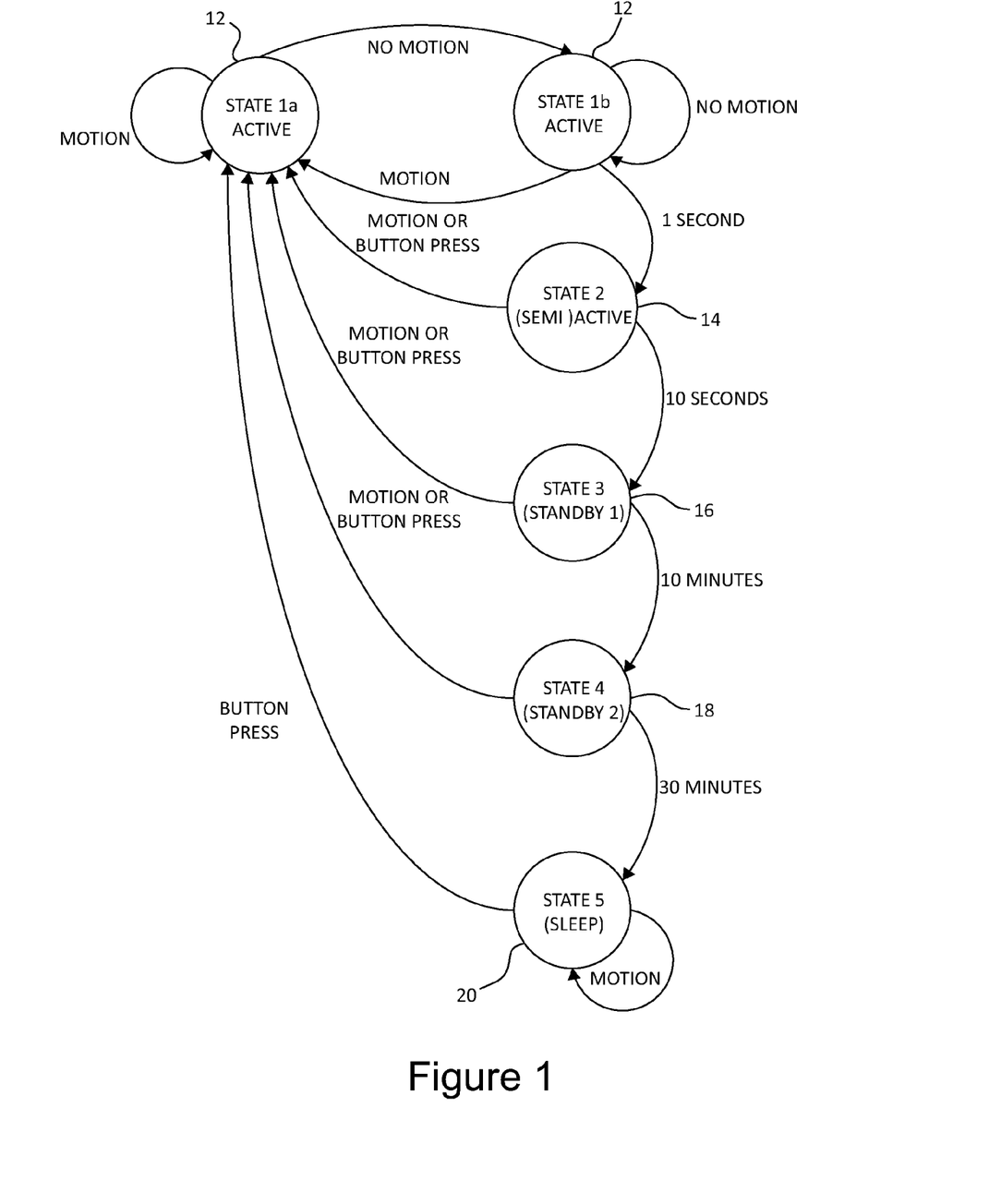
FIG. 1 shows a state diagram for a conventional optical mouse.

A typical wireless optical mouse has a five stage power-saving algorithm, as shown in FIG. 1. In a first stage, the mouse is in an active state 12, where mouse motion has been detected within a preceding one second interval. In active state 12, the optical sensor is fully active and capable of detecting movement with maximum precision and minimum latency.

In a second stage, the mouse is in a semi-active state 14. State 14 persists from a time one second since the last mouse motion was detected until ten seconds since the last motion was detected. During the second state 14, the optical sensor captures images less frequency and turns off the surface illumination when not capturing images. This results in increased latency in motion detection and much less precise detection of mouse movement.

In the third stage, the mouse is in the 'standby 1' state 16. This stage begins ten seconds after the last motion was detected and ends ten minutes later. In other words, the most recent mouse movement was more than ten seconds ago but less than ten minutes earlier. In state 16, the optical sensor and surface illumination are completely turned off for most of the time, but are turned on several times per second to check for motion.

After ten minutes in the standby state 16, the mouse moves into a fourth stage. In stage 4, the mouse transitions to (is in) the 'standby 2' state 18. This is where the most recent mouse movement occurred ten or more minutes earlier. State 18 has similar operation to the previous state 16, except that the sensor and illumination are turned on less frequently, typically once per second. After thirty minutes of no mouse activity, the mouse transitions to the fifth stage, where the mouse is in the 'sleep' state 20 and can only be woken by pressing a button.

This scheme has the following disadvantages. A first disadvantage is that the mouse is still consuming significant current for 30 minutes after a last mouse movement. A second disadvantage is that in standby modes, the user has to move the mouse for a perceptible period of time before the mouse wakes up and starts controlling the computer. Another disadvantage is that the user has to wake the mouse up in sleep mode by pressing a button.

Various alternative conventional methods of mechanically detecting motion are available. These methods can automatically wake up the mouse when it is asleep, thus eliminating the two standby modes. These alternative methods vary in cost and generally are only suitable for use in higher end mouse devices.

One such configuration includes a number of conductive balls housed in a small chamber. A plurality of electrical contacts make contact are located inside the chamber. Motion of the object containing the chamber causes the balls to move around making and/or breaking electrical connections between the electrical contacts. An electrical circuit detects movement of the device by identifying changes in the make/break state between the contacts.

Disadvantages of this system includes insensitivity to slow or small mouse movements. For example, a large acceleration is needed to activate the mouse. Even if moderately priced, in an application where every penny counts, the cost of this conductive ball arrangement may still be too high.

Figure 2:
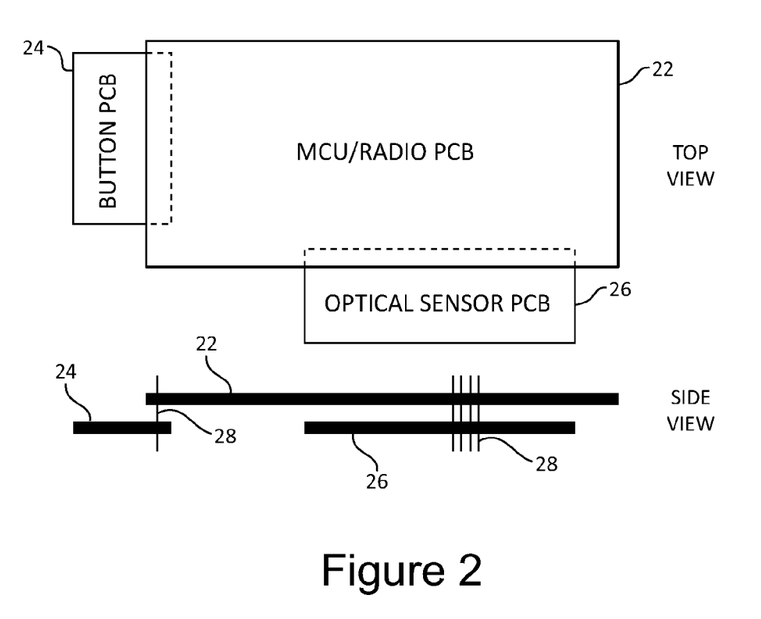
FIG. 2 shows a conventional construction of an optical mouse.

Referring to FIG. 2, a conventional wireless optical mouse comprises three Printed Circuit Boards (PCBs). A first PCB 22 contains a microcontroller, radio components and power management components. A second PCB 26 contains an optical motion sensor and a surface illumination LED. A third PCB 24 contains micro-switches activated by pressing mouse buttons, and possibly a sensor that detects rotation of a mouse scroll wheel.

The first PCB 22 is typically mounted towards the top of a mouse enclosure, while the second and third PCBs 26 and 24 are mounted on the base of the mouse enclosure. The top PCB 22 overlaps each of the lower PCBs 26 and 24 and connects to the lower PCBs 26 and 24 using pin headers 28 that are approximately 10 millimeters (mm) in length.

It would be desirable to have a low cost scheme for detecting small accelerations in electrical devices.

SUMMARY OF THE INVENTION

A motion detector includes a motion sensor that in one embodiment is an electrically conductive pin that has a fixed upper portion and a lower portion that swings from the upper portion while maintaining electrical conductivity. The lower portion of the pin is located within a hole that has conductive areas. A motion detection circuit identifies movements in a device containing the motion detector by monitoring the electrical contact status between the motion sensor and the conductive areas around the hole.

DETAILED DESCRIPTION

Figure 3:
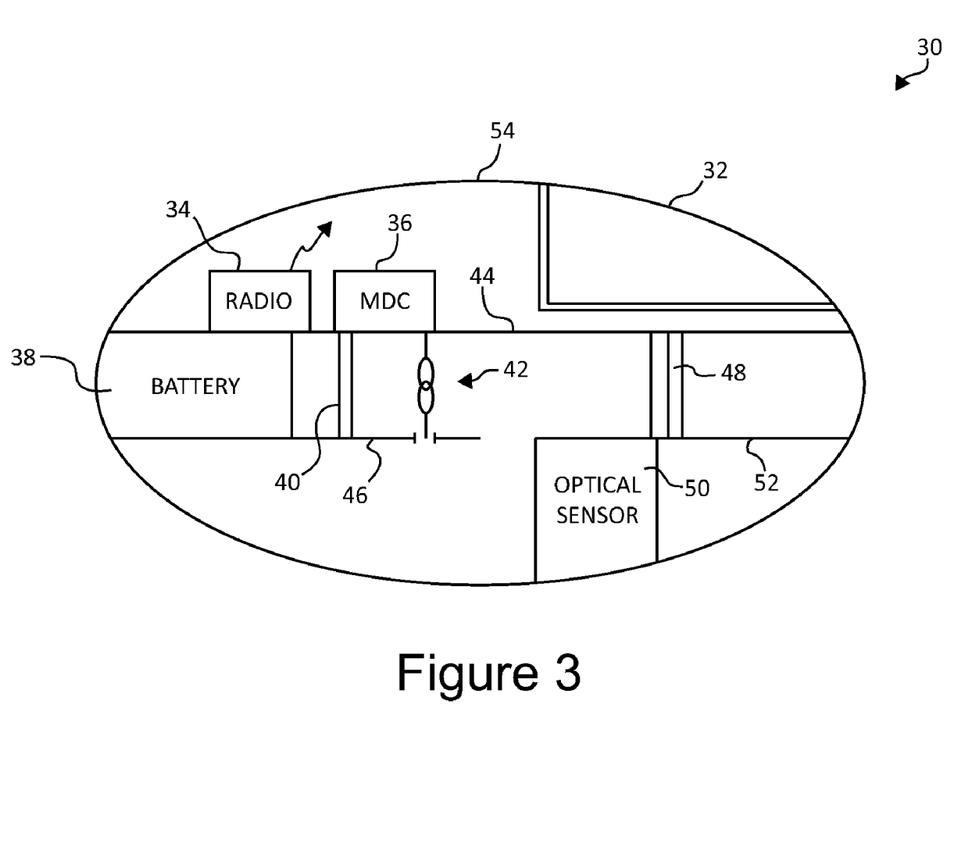
FIG. 3 shows side sectional view of an optical mouse with an improved motion detector.

FIG. 3 shows a side sectional view of an optical mouse that contains an improved motion detector. The motion detector can be used in any type of mouse, wireless device, or any other device that needs to electrically detect movement. The mouse 30 includes an outside enclosure 54 that includes buttons 32. The enclosure 54 contains a first upper Printed Circuit Board (PCB) 44 that includes a Motion Detection Circuit (MDC) 36 and a radio transmitter 34. A second lower circuit board 52 contains an optical sensor 50 and is electrically connected to the upper circuit board 44 through pins 48. A third lower circuit board 46 is electrically connected to the upper circuit board 44 through pins 40 and in one embodiment may contain circuitry used to detect button presses for buttons 32 and detect scroll wheel (not shown) movements. A battery 38 is contained somewhere in enclosure 54.

It should be noted that the actual physical arrangement of the circuit boards 44, 52 and 46 and the corresponding circuitry on the circuit boards can be different than that shown in FIG. 3. FIG. 3 just shows one example of the different elements that may be contained inside an optical mouse 30 and how they interact with an improved motion sensor 42

Figure 4:
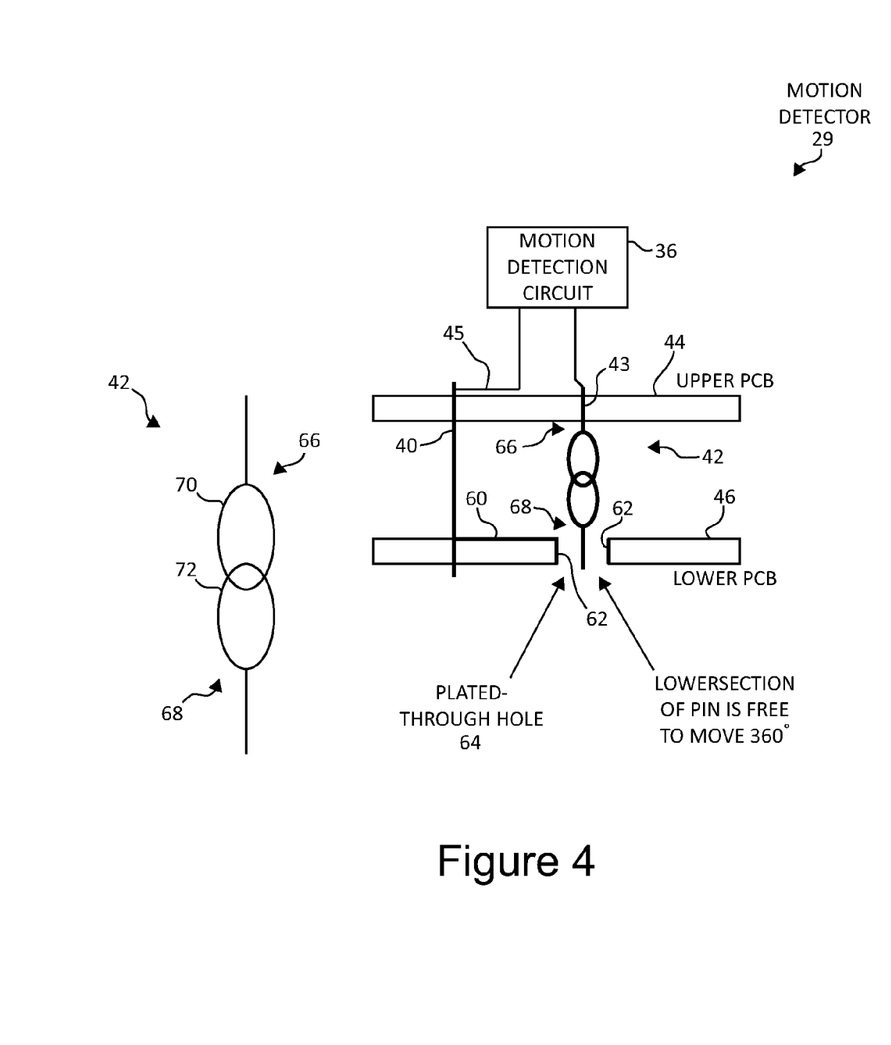
FIG. 4 shows a motion sensor used in the motion detector in FIG. 3.

The motion sensor 42 in one embodiment is a hinged pin that detects movements of mouse 30. FIG. 4 shows the hinged pin 42 and portions of the upper and lower circuit boards 44 and 46 in more detail and are referenced in the description below along with FIG. 3. The motion sensor 42 includes an upper portion 66 and a lower portion 68. The upper portion 66 includes a loop 70 that interlocks with a loop 72 on the lower portion 68.

The upper portion 66 and the lower portion 68 of motion sensor 42 are both made of a electrically conductive material, such as a metal material. The interlocked loops 70 and 72 allow the lower portion 68 to swing in any direction in a 360 degree two dimensional plane while at the same time maintaining continuous electrical connectivity with upper section 66.

Lower PCB 46 includes a hole 64 that in one example is a few millimeters in diameter. The hole 64 is aligned substantially directly below a mounting point 43 for the upper portion 66 of motion sensor 42. The lower portion 68 extends down through the hole 64. When the optical mouse 30 sits still on a substantially level surface, the lower portion 68 should sit substantially in the middle of hole 64 and not touch the inside edge of hole 64. The hole 64 in the lower PCB 46 is plated through with a conductive material 62 and is connected by a trace 60 on PCB 46 to one of the pin header contacts 40. The pin 40 electrically connects the conductive material 62 to a trace 45 on the upper PCB 44 that connects to MDC 36. An upper end of the motion sensor 42 is also electrically connected to the MDC 36. In one embodiment the conductive material 62 may be from a soft or slightly compressible material to dampen any acoustic noise that may be produced when the motion sensor pin 42 touches the edge of hole 64.

A suitably balanced motion sensor pin 42, with a sufficiently low friction hinge, can detect very small acceleration, and therefore movement of the mouse 30. In one implementation, the motion sensor 42 is designed so that its lower end 68 swings sufficiently to touch the conductive material 62 whenever enough force is applied to the mouse 30 to overcome friction and move the mouse 30 across a surface. The MDC 36 identifies movement of motion sensor 42 when the electrical contact state changes between the motion sensor 42 and the conductive material 62 in hole 64.

Figure 5:
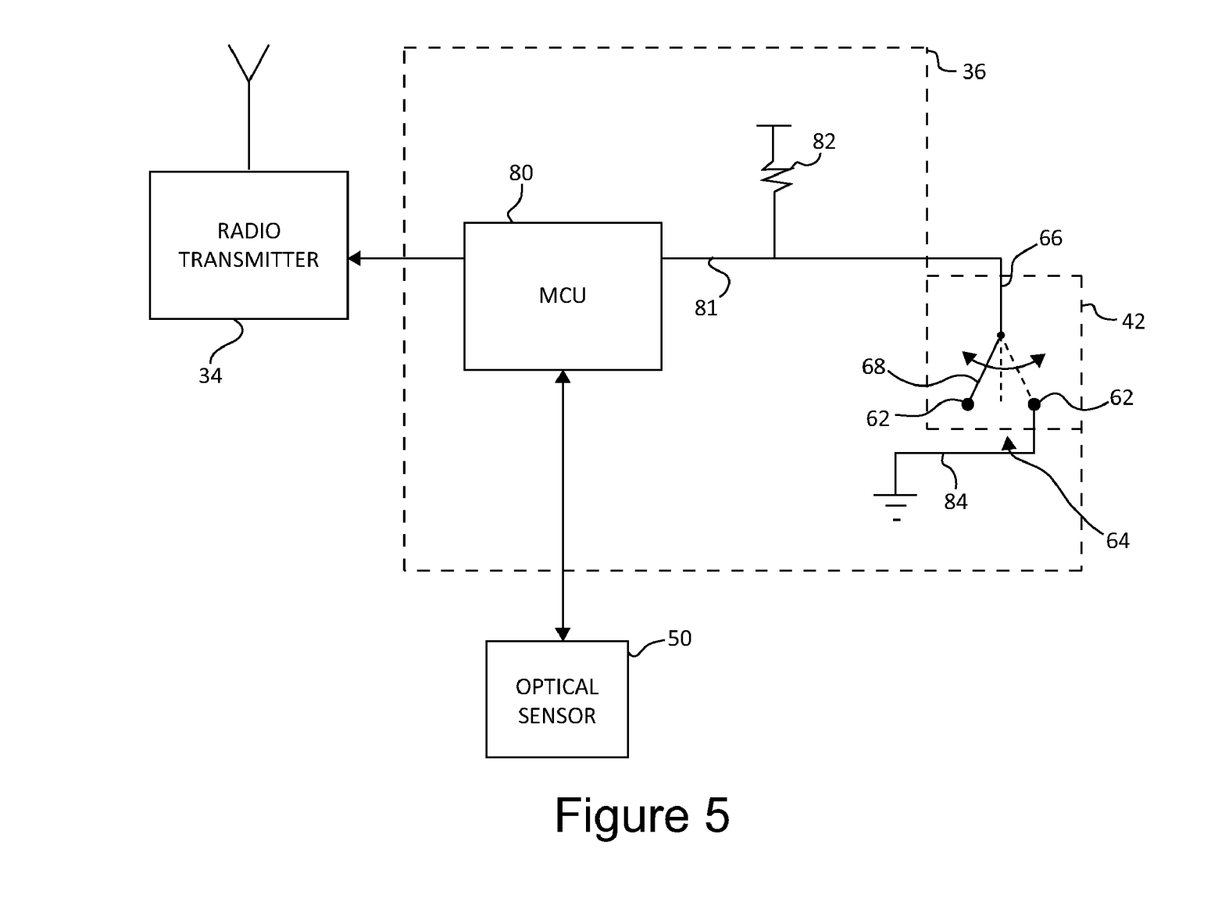
FIG. 5 shows a circuit diagram of a motion detection circuit used in the motion detector shown in FIG. 3.

FIG. 5 shows one example of the motion detection circuitry 36. The conductive material 62 on the inside edge of hole 64 is connected to an electrical ground signal 84 that is already present on the lower PCB 46 (FIG. 4). In this embodiment, no additional pin header contact 40 connects to the motion detection circuit 36. A Microcontroller Unit (MCU) 80 is connected to the radio transmitter 34 and to the optical sensor 50. An input/output (I/O) connection 81 on the MCU 80 is coupled to the upper end 66 of the motion sensor pin 42. A pull-up resistor 82 is connected to connection 81 and is either internal or external to MCU 80.

The lower end 68 of the hinged motion sensor pin 42 is accelerated when the mouse 30 in FIG. 3 is moved. This causes the motion sensor 42 to swing and come into contact with the conductive material 62 on the edge of hole 64. This motion is detected as a change in the electrical state on connection 81.

For example, when the lower end 68 of the motion sensor pin 42 is not touching the conductive material 62 (mouse 30 in stationary condition), the pull-up resistor 82 pulls the connection 81 to a high voltage state. When the lower end 68 of the hinged pin 42 touches the conductive material 62 on the edge of the hole 64 (mouse 30 movement condition), the ground signal 84 pulls the voltage on connection 81 to a low voltage state.

The MCU 80 detects this change in the voltage state on connection 81 and accordingly activates the optical sensor 50 and/or the radio transmitter 34. For example, when the signal on connection 81 is detected as changing between the logic high state and the logic low state, the MCU 80 determines the mouse 30 has been moved and turns on the optical sensor 50 and possibly the radio transmitter 34. The MCU 80 may turn off the optical sensor 50, or put the optical sensor 50 into a sleep state, when the same logic state is continuously detected on the connection 81 for some period of time.

Figure 6:
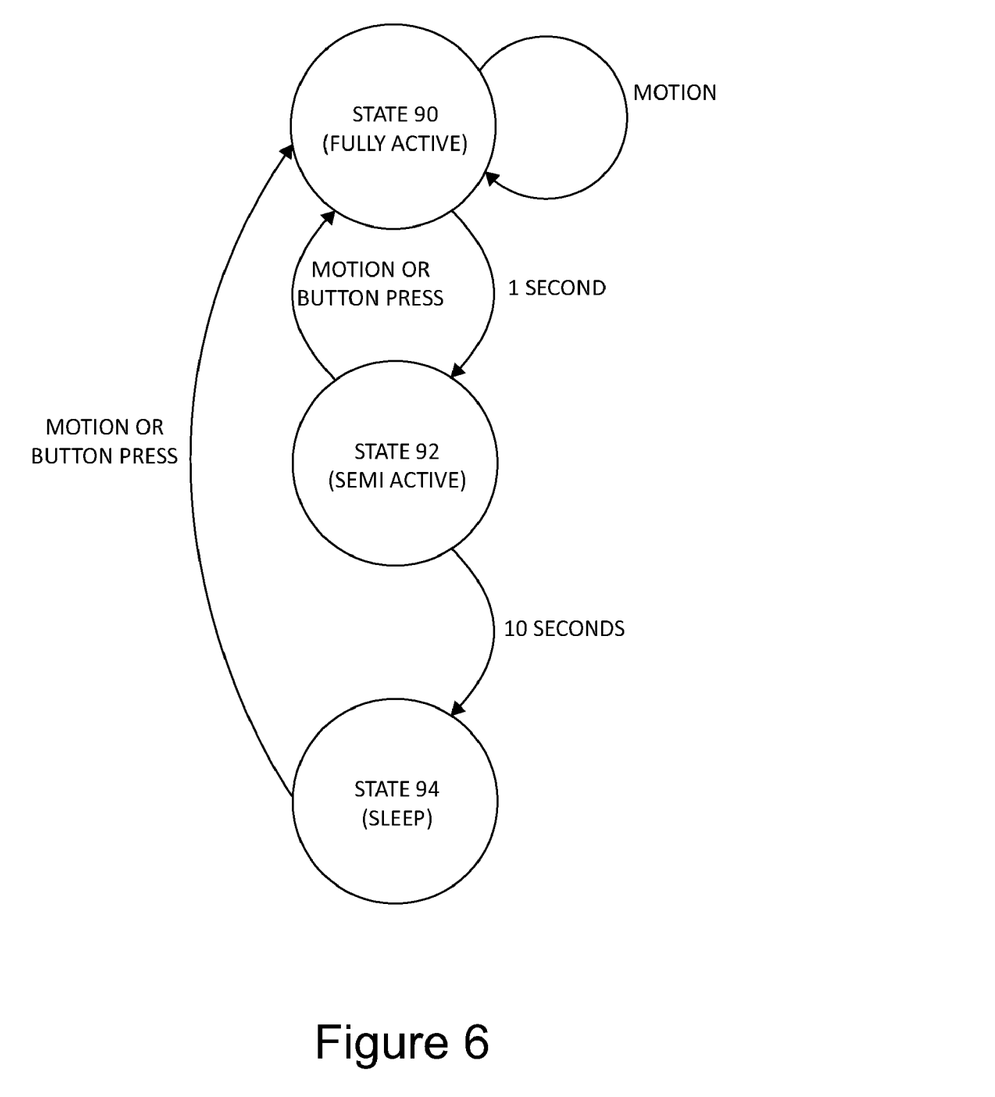
FIG. 6 is a state diagram showing one example of how the improved motion detector operates with the optical mouse shown in FIG. 3.

Referring to FIG. 6, the ability to detect motion of the optical mouse 30 enables implementation of the following two or three step power saving algorithm. In a first 'active' state 90, the mouse motion has been detected within the preceding one second interval. In state 90, the optical sensor 50 is fully active and capable of detecting movement with maximum precision and minimum latency.

In a second optional 'semi-active' state 92, the most recent mouse motion was detected within the preceding one to ten seconds interval. The optical sensor 50 captures images less frequently and turns off the surface illumination when not capturing images. This results in increased latency in motion detection, and much less precise detection of mouse movement. In a third 'sleep' state 94 the optical sensor 50 is turned completely off. The MCU 80 is woken and immediately turns on the optical sensor 50 when the motion sensor pin 42 identifies mouse movement. In an alternative embodiment, the second semi-active state 92 is not used.

Motion Detection on Non-Horizontal Surfaces

The motion detector may not necessarily be used on a flat surface. For example, the optical mouse 30 (FIG. 3) may be used on a slanted draftsman's table or the motion detector may be used in some type of remote control device that can be operated from a user's hand. When the device is not lying flat, the lower end 68 of the hinged motion sensor pin 42 (FIG. 3) could continuously sit against the inside edge of the hole 64. Thus, the motion sensor pin 42 could establish an electrical contact with the conductive material 62 even when the mouse 30 is not moving.

When the device 30 (FIG. 3) is being moved around on a slanted surface, substantially greater acceleration is needed to cause the motion sensor pin 42 to make and break contact with the conductive material 62 on the edge of hole 64. This is due to the force of gravity that constantly pulls the motion sensor pin 42 against the edge of the hole 64.

Figure 7:
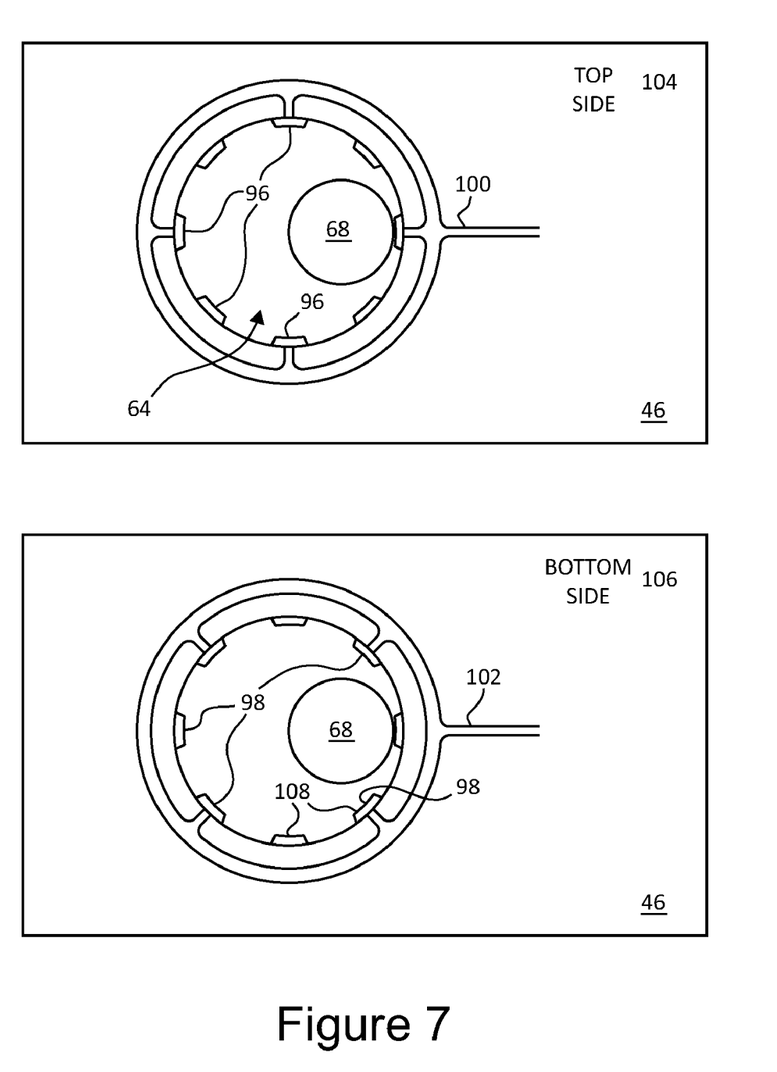
FIG. 7 shows an alternative embodiment of the motion sensor that can be used to detect movements of an object that operates at an angle.

FIG. 7 shows an alternative embodiment of a motion detector that detects small accelerations of a device that operates on a sloped surface. FIG. 7 shows a top side 104 and a bottom side 106 of the lower printed circuit board 46 previously shown in FIG. 4. In the basic form of the motion detector shown in FIG. 4, the hole 64, in which the hinged pin 42 swings, is plated all along its circumference. In the embodiment shown in FIG. 7, there are two sets of spaced apart plated conductive areas 96 and 98 that extend around the inside circumference of the hole 64. The conductive areas 96 and 98 each extend down through hole 64 from the top side 104 to the bottom side 106 of PCB 46. However, the conductive areas 96 and 98 extend down through the inside circumference of hole 64 in a spaced apart interleaved-alternating arrangement.

The members of conductive areas 96 are connected to each other and the members of conductive areas 98 are connected together. But the conductive areas 96 are not connected to conductive areas 98. For example, a conductive trace 100 on the top side 104 of PCB 46 connects the conductive areas 96 together. A second conductive trace 102 on the bottom side 106 of PCB 46 connects together the conductive areas 98. The conductive areas 96 and trace 100 are not directly connected to the conductive areas 98 and trace 102.

In these applications, the lower end 68 of the motion sensor 42 might normally be in contact with the inside edge of hole 64 when the device 30 (FIG. 1) is at rest or in normal operation. For example, when the device 30 is operating on a slanted table. The width of conductive areas 96 and 98, and the width of gaps 108 between the conductive areas 96 and 98, are selected so that when the motion sensor pin 42 is in contact with the edge of hole 64, the lower end 68 is usually in contact with at least one of the first set or second set of conductive areas 96 or 98.

In this electrical-mechanical arrangement, the motion detection circuit 36 detects movements of the motion sensor pin 42, even when the lower end 68 continuously moves along the edge of hole 64.

Figure 8:
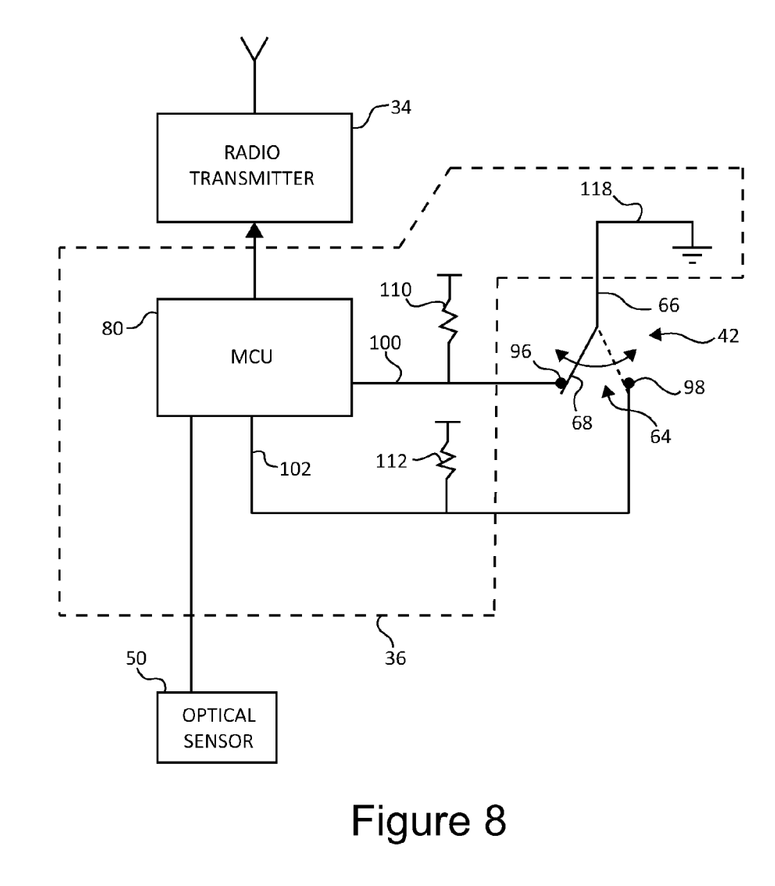
FIG. 8 is a circuit diagram that can be used with the motion sensor shown in FIG. 7.

Referring to FIG. 8, the top end 66 of the motion sensor pin 42 is connected to ground signal 118. The connection 100 previously shown in FIG. 7 is connected to one pin of MCU 80 and the connection 102 previously shown in FIG. 7 is connected to another separate pin of MCU 80. Connection 100 is connected to a weak pull-up resistor 110 and connection 102 is connected to another pull-up resistor 112. Similarly to FIG. 5, the pull-up resistors 110 and 112 may each be located inside of MCU 80. Whenever, the lower end 68 of motion sensor 42 contacts one of the conductive areas 96 or 98, the corresponding signal on conductor 100 or 102, respectively, is pulled to a logic low voltage state by ground signal 118. When the lower end 68 is not contacting either conductive areas 96 or 98, the signals on conductors 100 and 102 are each in a logic high voltage state.

When the device 30 (FIG. 1) is in use on a level surface, motion is detected when the signal on either connection 100 or 102 changes from a logic high voltage state to a logic low voltage state. This results from the hinged motion sensor pin 42 swinging freely as a result of acceleration and contacting one of the conductive plated conductive areas 96 or 98 on the inside circumference of hole 64 (see FIG. 7).

When in use on a sloping surface, even very small accelerations will cause the lower end 68 of motion sensor pin 42 to travel small distances around the circumference of the hole 64. This will change the logic state of at least one of the conductors 100 or 102 for even the smallest movement of lower end 68. For example, a small movement of motion sensor pin 42 along the inside edge of hole 64 may establish a new contact with one of conductive elements 96 or 98, or may break a previously established contact with one of conductive elements 96 or 98. Any change of logic state in either connection 100 or 102 is interpreted by MCU 80 as a movement of the device 30 containing the motion sensor pin 42. Thus, the motion detector shown in FIGS. 7 and 8 can identify small movements of a device operating in an angled position.

Alternative Motion Sensor Designs

Many different motion sensor designs are possible. The embodiments described above are intended simply examples and should not be interpreted as limiting the scope of the motion detector.

In some applications, it may only be desired to detect motion/acceleration in a single direction, rather than 360 degrees of motion anywhere in a two-dimensional plane. In this case, a hinged motion sensor pin design can be used that only allows movement in one axis. In another embodiment, motion in any direction in a plane could alternatively be detected by using two pins moving within two plated-through holes, each pin having a single axis hinge, with the hinge axes of the two motion sensor pins being orthogonal.

Figure 9:
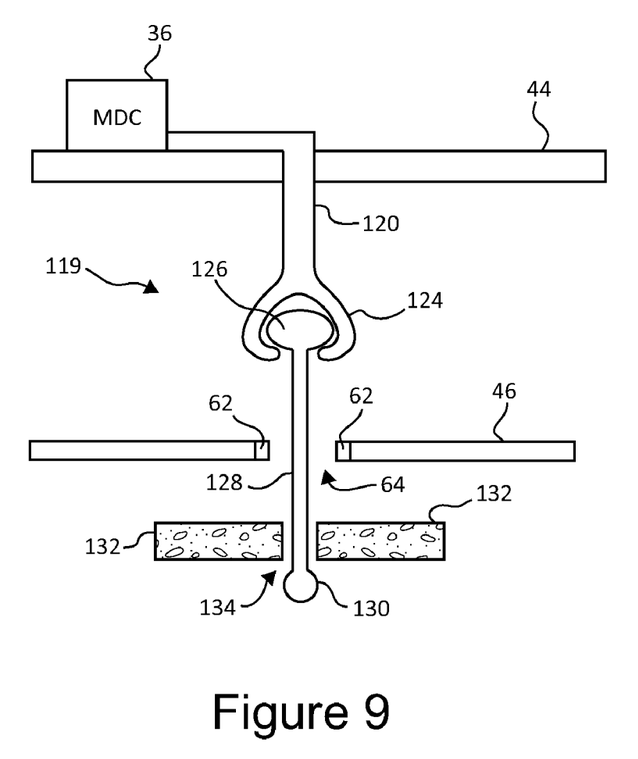
FIG. 9 shows another alternative embodiment of the motion sensor.

It is typically desired to detect very small accelerations. However, in alternative implementations is may be desirable to only detect larger accelerations, or to detect tilting beyond a pre-determined limit. FIG. 9 shows one alternative motion sensor 119 that includes a lower portion 128 having a weighted bottom end 130. The lower portion 128 protrudes out of the bottom of the plated-though hole 64 of PCB 46. Mounted below the plated through hole 64 is a cylinder of foam 132 or some other compressible material. The foam 132 includes a hole 134 that is concentrically aligned with the hole 64 in the PCB 46. The internal diameter of hole 134 in foam 132 is smaller then the diameter of the plated hole 64 in the PCB 46.

Small accelerations (or small tilt angles) would not accelerate the weighted lower portion 128 of the motion sensor 119 enough to compress the foam 132 and bring the lower pin portion 128 into contact with the conductive elements 62 on the inside edge of hole 64. However, a larger acceleration causes the weight of the lower portion 128 to compress the foam 132 and bring the lower portion 128 into contact with the conductive elements 62 on the inside edge of hole 64. This contact is monitored by the motion detection circuit 36 for identifying movement of a device.

In another alternative embodiment, the hinge used to connect the upper portion 120 to the lower portion 128 of motion sensor 119 is different than the interlocked loop configuration shown in FIG. 4. The hinge in FIG. 9 includes a bell shaped flange 124 that extends from the bottom end of the upper portion 120. A round or oval shaped piece 126 is formed on the top of lower portion 128 and seats inside of the flange 124. The piece 126 can swing in any direction within a 360 degree circumference.

The improved motion detector could be used as an anti-theft device for devices normally kept stationary. A short "timeout" period could be used to ignore motion caused by accidental shocks, and in one exemplary embodiment if motion continued for a long period, an alarm or other security feature could be activated.

The motion detector can also be used in corded optical mice in order to meet the power requirements of the Universal Serial Bus (USB) specification. The motion detector also provides longer battery life in wireless devices at negligible cost and enables wireless devices, such as optical mice, to wake from their lowest power mode as a result of motion, rather than needing a mouse button to be pressed. Acceleration thresholds are also easily adjustable by varying the weight and length of the lower section of the hinged pin.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A device comprising:
a user graspable enclosure configured to receive an acceleration corresponding to a user input;
a stacked pair of upper and lower printed circuit boards positioned in the user graspable enclosure, wherein the upper and lower printed circuit boards are substantially parallel;
a motion sensor pin comprising an upper portion connected to the upper printed circuit board and a lower portion coupled to the upper portion with a hinge connection, the hinge connection configured to allow the lower portion to move independently of the upper portion within a hole formed in the lower printed circuit board wherein the motion sensor pin is configured to establish an electrical connection when the lower portion contacts a conductive material formed proximate an inside edge of the hole responsive to receiving the acceleration;
a compressive material configured to receive the lower portion of the motion sensor pin, wherein the lower portion of the motion sensor pin is configured to compress the compressive material prior to contacting the conductive material; and
a motion detector circuit coupled with the motion sensor pin, wherein the motion detector circuit is configured to deactivate a computer device in response to detecting a constant logic state of the electrical connection for a threshold period of time.

2. The device according to claim 1, wherein the upper printed circuit board contains a first conductor that electrically connects the motion sensor pin to motion detection circuitry on the upper printed circuit board and the lower printed circuit board includes a second conductor that connects the conductive material to additional motion detection circuitry on the lower printed circuit board, wherein the motion detector circuit comprises the motion detection circuitry on the upper printed circuit board and the additional motion detection circuitry on the lower printed circuit board.

3. The device according to claim 1 wherein the motion sensor pin includes a first loop on the upper portion and a second loop on the lower portion that are interlocked together to form the hinge connection.

4. The device according to claim 1, wherein the motion detector circuit is further configured to monitor the electrical connection established with the motion sensor pin and to activate the computer device in response to detecting a change in the logic state of the monitored electrical connection.

5. The device according to claim 4, wherein the motion detector circuit is configured to change the computer device between a full power mode and a reduced power or sleep mode according to changes in the monitored electrical connection.

6. The device according to claim 1 wherein the conductive material formed proximate the inside edge of the hole comprises multiple spaced apart contacts.

7. The device according to claim 6 wherein the width and spacing of the multiple spaced apart contacts are sized so that the lower portion of the motion sensor pin contacts at least one conductive area when contacting the inside edge of the hole.

8. The device according to claim 6, wherein the multiple spaced apart contacts are grouped into a first set of contacts connected together in a first circuit and a second set of contacts interleaved between the first set of contacts and connected together in a second circuit that is not electrically connected to the first circuit.

9. The device according to claim 1, wherein the lower portion is substantially rigid.

10. An electrical device, comprising:

a first circuit board;

a motion sensor having an electrically conductive top end that is coupled to the first circuit board and an electrically conductive substantially rigid bottom end configured to swing independently of the electrically conductive top end;

a second circuit board located below and substantially parallel to the first circuit board and defining a hole for receiving the bottom end of the motion sensor, the hole having an inside edge with a conductive material formed on the inside edge;

a compressible material configured to receive the substantially rigid bottom end of the motion sensor, wherein the substantially rigid bottom end is configured to compress the compressible material prior to contacting the conductive material; and a motion detection circuit configured to detect an acceleration corresponding to a hand movement of a computer user responsive to a change in electrical connectivity between the motion sensor and the conductive material, wherein the motion detection circuit is part of the first circuit board, and wherein the motion detection circuit is configured to activate a sensor in response to detecting the change in a logic state of the electrical connectivity, and to reduce power consumption of the sensor in response to detecting a constant logic state of the electrical connection for a threshold period of time.

11. The electrical device according to claim 10, wherein the sensor is an optical sensor.

12. The electrical device according to claim 10, wherein the first circuit board is electrically coupled to the second circuit board outside of the hole in the second circuit board.

13. A device, comprising:

a motion sensor having an upper portion supported by an upper substrate, and a lower portion that swings within a hole formed in a lower substrate, wherein the lower substrate is substantially parallel to the upper substrate;

a compressive material proximate the lower substrate, wherein the lower portion of the motion sensor compresses the compressive material before forming an electrical contact with a conductive material formed on an inside edge of the hole; and a first motion detection circuit coupled with the motion sensor, wherein the first motion detection circuit is configured to detect a logic state of the electrical contact, and wherein the motion detection circuit is configured to reduce power consumption of a computer device in response to detecting a constant logic state of the electrical connection for a threshold period of time.

14. A device, comprising:

a motion sensor comprising a stacked pair of generally parallel upper and lower printed circuit boards, wherein an upper portion of the motion sensor is supported by the upper printed circuit, and a lower portion of the motion sensor swings within a first hole formed in the lower printed circuit board;

a compressive material proximate the lower printed circuit board and forming a second hole configured to receive the lower portion of the motion sensor, wherein the lower portion of the motion sensor compresses the compressive material before forming an electrical contact with a conductive material formed on an inside edge of the first hole; and a first motion detection circuit coupled with the motion sensor, wherein the first motion detection circuit is configured to detect a logic state of the electrical contact, and wherein the motion detection circuit is configured to reduce power consumption of a computer device in response to detecting a constant logic state of the electrical connection for a threshold period of time.

* * * * *